United States Patent [19]

Thomson et al.

[11] 4,227,049

[45] Oct. 7, 1980

[54] AUDIO SYSTEM FOR ISOLATING SOUNDS FROM INDIVIDUAL COMPONENTS OF DRUM SET-UP FOR SELECTIVELY MIXING

[76] Inventors: Ian W. Thomson, 151 Miramontes Rd., Woodside, Calif. 94062; Charles D. Limbaugh, 552 Culp Ave., Hayward, Calif. 94544; JoEllen Burch, 553 63rd St., Oakland, Calif. 94609

[21] Appl. No.: 963,821

[22] Filed: Nov. 27, 1978

[51] Int. Cl.³ .......... G01H 1/00

[52] U.S. Cl. .......... 179/1 M; 179/1 J; 84/1.24; 84/104

[58] Field of Search .......... 179/1 M, 1 J, 1 D, 1 SW, 179/1 FS; 84/1.06, 1.14, 1.24, 1.25, 104, DIG. 24, 171, 411 M, 411 P, 411 R, 414

[56] References Cited

U.S. PATENT DOCUMENTS

| | | | |
|---|---|---|---|
| 1,579,893 | 4/1926 | Simpson | 84/411 M |
| 3,553,338 | 1/1971 | Holman | 84/1.14 |
| 3,610,804 | 10/1971 | Matsuura | 84/1.24 |
| 3,823,245 | 7/1974 | Suzuki | 84/1.24 |
| 3,978,421 | 8/1976 | Walker | 84/1.25 |
| 4,069,732 | 1/1978 | Moskowitz et al. | 84/1.14 |

FOREIGN PATENT DOCUMENTS

| | | | |
|---|---|---|---|
| 964362 | 3/1975 | Canada | 84/1.14 |

*Primary Examiner*—Douglas W. Olms
*Attorney, Agent, or Firm*—Flehr, Hohbach, Test, Albritton & Herbert

[57] ABSTRACT

A sound system, particularly useful for isolating the signals from each of a plurality of different sources disposed closely together, such, as for example, from the components of a drummer's set-up of drums and cymbals. The system includes individual transducers associated with each of the drummer's units to provide separate and mutually independent signal sources. The signals from each source are transduced along an associated channel to provide a discrete path for each. Each of the channels includes a selectively settable tone control means for modifying the signals thereof. Finally, each channel includes means for selectively coupling the output of the associated tone control means to one or more of a plurality of devices applying "special effects" to the input signals thereto. In a system of the kind described means are carried by impact portions of each of the drummer's units so as to inhibit objectionable mechanical feedback into the transducer caused by prolonged vibration of the impact portion, and to reduce the sound level when played.

7 Claims, 11 Drawing Figures

FIG_1
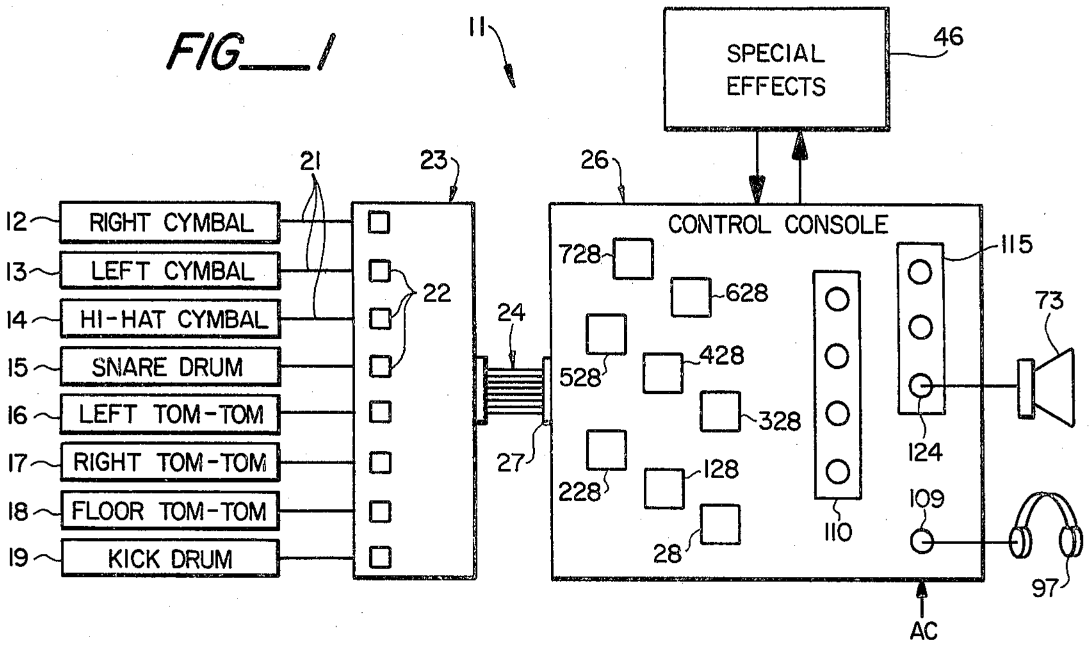
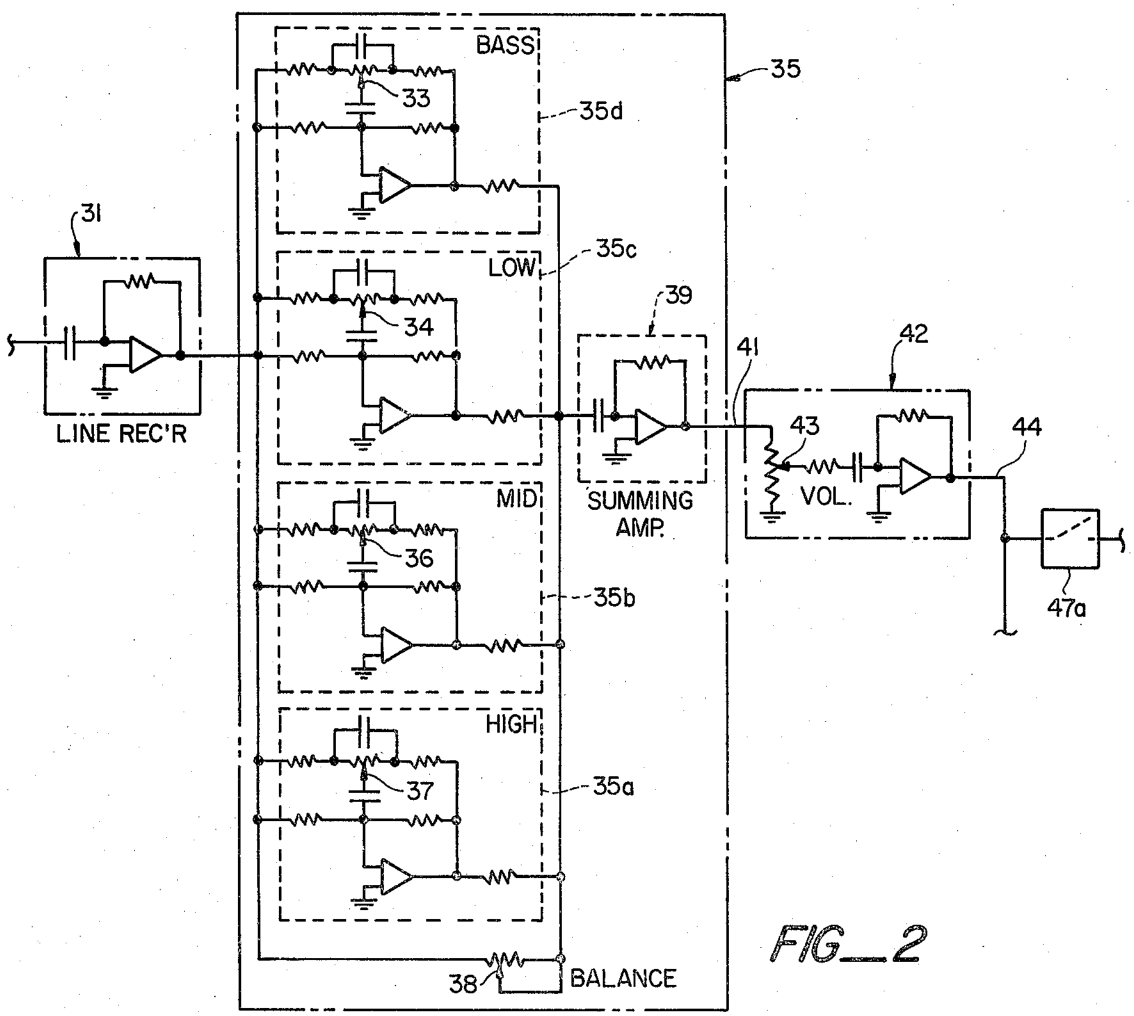
FIG_2

(+)
(-)

AUDIO SYSTEM FOR ISOLATING SOUNDS FROM INDIVIDUAL COMPONENTS OF DRUM SET-UP FOR SELECTIVELY MIXING

BACKGROUND OF THE INVENTION

This invention pertains to a sound system and more particularly to a sound system in which leakage between signal sources is minimized if not eliminated so as to permit the signals from each source to be electrically modified independently of the remaining signals of the system.

The present invention is particularly useful in conjunction with the reproduction of music from an array of impact sound generating instruments such as found in the typical drummer's set-up of cymbals, tom-toms and drums.

Heretofore in recording, broadcasting, or providing live musical performance the sounds emanating from the drummer's station have been obtained by employing a number of microphones each specifically located closely adjacent to a given portion of the drummer's set-up. Thus, one microphone might be located low and near the snare drum while another microphone might be located relatively closely to an adjacent tom-tom.

It has been observed that an arrangement of the foregoing kind makes it extremely difficult to hear each portion of the drummer's equipment being played separately since the sound from one unit will leak to the microphone monitoring another unit of the set-up. Accordingly, a microphone which has been established to monitor the snare drum might also be partially monitoring any one of several additional units. This can cause mixing, channel separation, and phasing problems in studio recording. Additionally, when performing "live", amplification can create undesirable feedback, thereby limiting the degree of amplification obtainable.

At present much music is being monitored by electronic means so as to be modified electronically and reproduced with additional characteristics imparted thereto by means of devices known as "special effects". Examples of some of the "special effects" presently known (1) apply an acho or reverberation system for modifying the sound from a musical instrument. Others serve (2) to apply a phase shift; (3) fuzz; or (4) a triggered "wah-wah" sound. Accordingly, it is clear that if it is desired to apply a given special effect to the sound of the snare drum but not to the sound of an adjacent tom-tom, the use of conventional microphones as now known causes the sound from the tom-tom to be incorporated into the sound of the snare drum and both of these sounds together will then be modified by the selected special effect whether the operator desires this result or not.

As disclosed herein an improved sound system is provided whereby the sounds being monitored are isolated by transducing signals directly from their dynamic portions.

SUMMARY OF THE INVENTION AND OBJECTS

In general, a sound system has been provided for transducing audio signals from a plurality of sources originating the audio signals. Transmission channels respectively associated with each of the audio sources serve to carry the transduced signals. Means for creating a plurality of special effects to be applied in common to the signals from the audio sources are further provided together with control means for selecting one or more special effects to be applied to the signals of each said channel.

In general, it is an object of the present invention to provide an improved sound system employing means for isolating sounds from closely adjacent sources so as to provide a means for discrete mixing of sounds from said sources, as in multi-track tape recording.

It is a further object of the present invention to provide a sound system for selectively applying special effects to the sounds monitored from transducers associated with separate sources originating the sounds.

Yet another object of the invention is to provide means for damping prolonged vibration of impact portions of the sound generating equipment so as to inhibit objectionable mechanical feedback through the system via a transducer carried by the impact portion of the unit struck, and to reduce the normal acoustic sound level.

The foregoing and other objects of the invention will become more readily evident from the following detailed description of preferred embodiments when considered in conjunction with the drawings.

BRIEF DESCRIPTION OF THE DRAWINGS

FIG. 1 shows a diagrammatic general arrangement of the system according to the invention.

FIG. 2 shows a schematic electrical diagram of a four band tone control unit employed in the system;

DETAILED DESCRIPTION OF PREFERRED EMBODIMENTS

As shown in FIG. 1 a sound system 11 includes means for transducing signals at a plurality of sources such as represented by the eight rectangular boxes numbered 12–19, respectively. Each box represents a signal source to be transduced, such as, a right cymbal, left cymbal, hi-hat cymbal, snare drum, left tom-tom, right tom-tom, floor tom-tom and kick (i.e. bass drum). Signals transduced from each of these specific sources are fed via their associated input lines 21 to a line driver 22 maintained in a junction box 23.

Figures 3, 4:
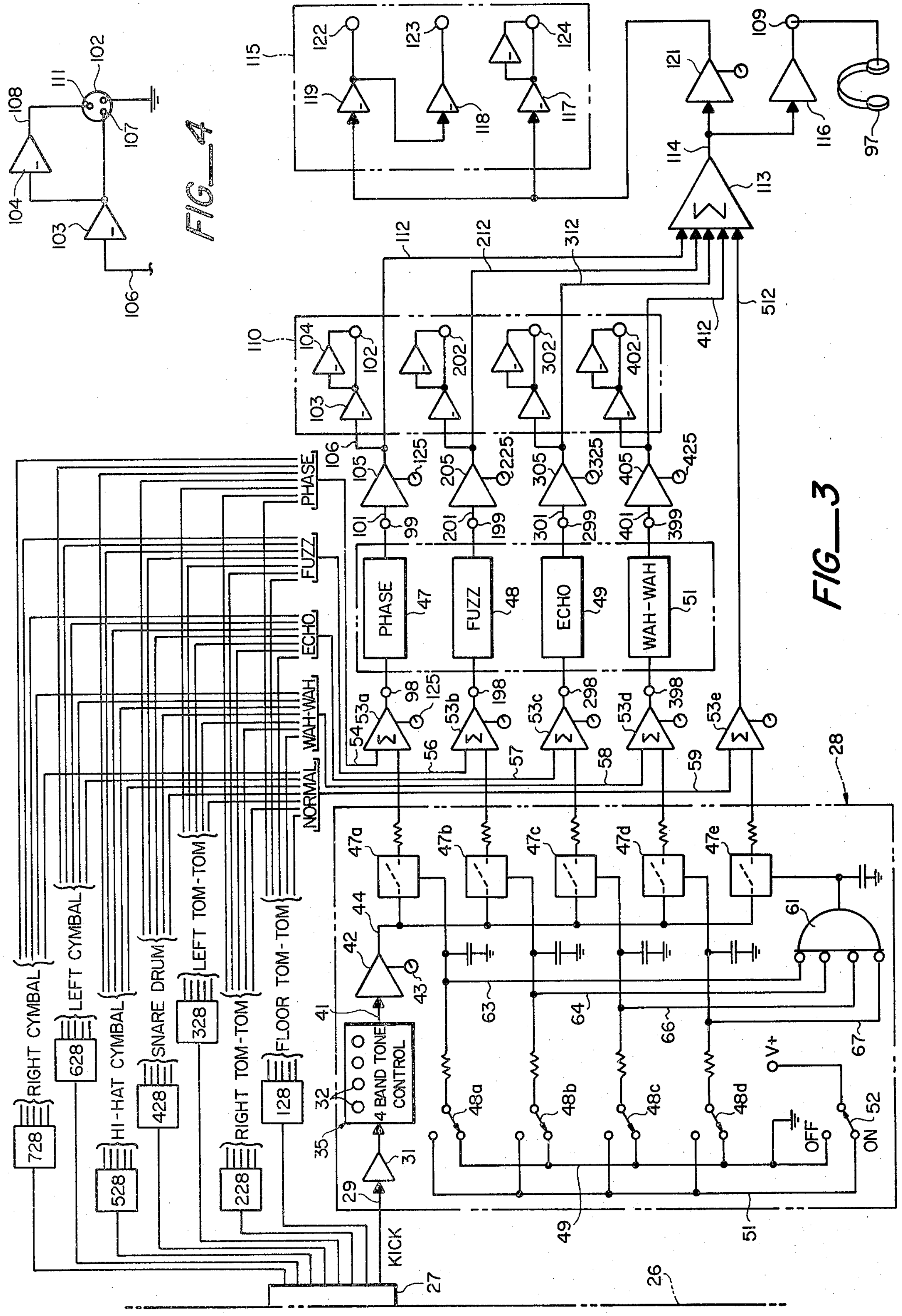
FIG. 3 shows a diagrammatic view of the overall system with a single channel shown in detail.
FIG. 4 shows a detailed view of means for providing a balanced output to an output jack.

Each of the transduced signals from units 12–19 is transmitted along its associated channel from junction box 23 via the shielded multi-conductor cable 24 to be modified by a control console 26 in a manner as now to be described with respect to FIGS. 2 and 3.

Each channel of information is supplied to console 26 via cable 24 coupled by means of the multi-strand receptacle 27. As shown there are eight channels in the system. Inasmuch as each of the channels is constructed to operate in substantially the same way, a description of the eighth (kick) channel should suffice as an explanation of the balance of the other channels.

Accordingly, the eighth channel receives signals transduced from a bass drum where a kick pedal is located. These signals travel from the "kick" source 19 via line driver 22 in junction box 23 and cable 24 to a signal modification section 28 outlined in phantom lines in FIG. 3. The input to circuit 28 arrives via lead 29 to be amplified by line receiver 31. The output from receiver 31 leads to a selectably settable tone control means associated with that particular channel (kick) for modifying the signals thereof.

Such a tone control means as shown in FIGS. 2 and 3 includes four variable potentiometers 33, 34, 36, 37 operated by knob 32 of unit 35. Accordingly, tone control unit 35 includes four sections 35*a–d* for respectively providing adjustment to high frequency, mid-frequency, low frequency and very low frequency (bass).

The output from each of Sections 35*a–d* is balanced with respect to the over-all input to all four sections by means of potentiometer 38, and then fed via a summing amplifier circuit 39 to provide an output via lead 41 to be amplified by the variable gain amplifier circuit 42 controlled by potentiometer 43.

The output from circuit 42 then appears on line 44 common to a plurality of switch means to be described further below.

Means are provided for creating a plurality of so-called "special effects" to be applied to the signals from each source originating a signal. Means for applying "special effects" to music signals are of known style. As herein described the "special effects" means is adapted to be coupled into the circuitry as disclosed in FIG. 3. Special effects unit 46 includes separate devices adapted to be coupled into the system for introducing variations to the signals known as phase shift 47, "fuzz" 48, "echo" 49 and "wah-wah" 51.

Signal modification unit 28 (and corresponding units 128, 228, 328, 428, 528, 628 and 728 for other channels) not only includes the selectively settable tone control unit 35, but also includes means for selecting a special effect to be applied to the signals of its associated channel, e.g. "kick" in channel 28.

Accordingly, as shown in FIG. 3 a control circuit for the kick channel includes a plurality of four switch elements 47*a–d* and a fifth switch element 47*e* for use in transmitting the signals of the kick channel free of special effects.

The switching elements 47*a–d* such as electronic transmission gates are each operated by an associated one of four manually operable switches 48*a–d* movable between advanced and retracted positions to either connect to a ground line 49 or to a "master effects" line 51. A master effects switch 52 is selectively operable between ON and OFF positions as will be described further below.

Normally switch 52 is disposed on its ON position (as shown) for applying power to line 51. Then, when any one or more of switch 48*a–d* are operated to connect to "master effects" line 51, the switching elements 47*a–d* associated with those of switches 48*a–d* which have been so operated will be switched to transmit the signals from line 44 to summing amplifiers 53*a–d,* respectively.

Each of the other seven channels shown in FIG. 3 includes a signal modification unit, such as unit 28 described above, having five output lines leading therefrom. As noted, these other units are numbered 128, 228, 328, 428, 528, 628 and 728. The output of the four band tone control unit in each of these signal modification units can similarly be directed to special effects unit 46 to apply any of a plurality of special effects to such signals. As thus arranged the five selected outputs from each of units 128, 228, etc. are fed to the summing amplifiers 53*a*–53*e* respectively.

For simplification the lines leading to the five summing amplifiers 53*a*–53*e* from each of the other channels, 128, 228, etc. have been merged into a single line for each special effect selected, i.e. lines 54, 56, 57, 58 and 59, respectively, for each effect. Thus, lines 54, 56, etc. each represent one or more selected paths for directing signals from the other channels to an associated summing amplifier 53 common to all channels. Lines(s) 58 is (are) directed to summing amplifier 53*e* for directing signals thereto which are desired to remain unmodified by any special effects.

In the event that no special effect has been selected by switches 48*a–d* of any given channel, means as now to be described serve to couple line 44 to summing amplifier 53*e* for further transmission unmodified by any special effect.

Whenever all switches 48 are in their grounded positions the output 62 from a four input NOR gate 61 goes positive since all inputs thereto via leads 63, 64, 66, 67 are negative. Thus, the output 62 from NOR gate 61, when positive, serves to activate switching element 47*e* to couple signals from line 44 to amplifier 53*e.*

Signals transduced from all eight signal sources as noted above can be selectively modified by one or a plurality of special effects or transmitted free of any special effect. Accordingly, all of the signal sources in which, for example, phase shift has been selected to be applied appear at the output of the sub-mix summing amplifier 53*a*, the gain of which is controlled by potentiometer 125. The output thereof is coupled by phone jack 98 to the special effect phase shift unit 47 whose output appears at phone jack 99, coupled to the input 101 of amplifier 105.

The output from amplifier 105 is subsequently fed to a balanced, low impedance output jack 102 via a pair of amplifiers 103, 104. As shown in FIG. 4 the input on lead 106 is first amplified and inverted and then connected to a first output pin 107 while a second amplifier 104 inverts the output of amplifier 103 and supplies that signal via lead 108 to a second pin 111 of that outlet.

A signal reproducing means such as a tape recording machine, or the like may be coupled to outlet 102.

Similarly, each of the other sub-mix summing amplifiers 53*b,* 53*c,* 53*d* carry signals from any of the eight sources which have been selected as described so as to be modified by the special effects 48, 49, 51 associated with sub-mix summing amplifiers 48, 49, 51, respectively. Accordingly, their outputs are coupled through the respective phone jacks 198, 298, 398 to the special effects units 48, 49, 51 and return via phone jacks 199, 299, 399, respectively. Additionally, the respective signals carried by lines 201, 301, 401 are amplified and coupled to outlet jacks 202, 302, 402 by means similar to that described above for special effect "phase shift".

In addition to providing outputs 102, 202, 302, 402 for tape recording, the outputs from amplifiers 105, 205, 305, 405 and 53*e* are fed via leads 112, 212, 312, 412 and 512, respectively, to a master summing amplifier 113 which serves to sum all of the signals as modified or not. The output appearing at lead 114 is connected to driver 116 so that the headphones outlet 109 will receive a composite of all of the modified and unmodified signals separately transduced from the eight different sources.

Other inverting amplifiers 117, 118, 119 are connected to a master gain amplifier 121 to provide a composite master balanced output at outlet 124 for supplying an input to a loudspeaker 30 or other suitable sound reproducing means. Separate unbalanced outputs appear at 122 and 123.

From the foregoing it will be readily evident that there has been provided a sound system for transducing audio signals from a plurality of discrete sources originating said signals. Means for isolating the signals from the sources with respect to each other as described further below serves to substantially eliminate leakage of signals between the sources thereof.

Transmission channels respectively associated with each of the sources serve to carry the signals of a given source. Selectably settable tone control means for each channel serve to modify the signals thereof as noted. Control means for each of the channels permits the selection of one or more special effects to be applied to the signals of any given channel. Finally, means for directing all signals in common to each special effect have been provided.

Means for isolating the audio signals originated by the respective sources from each other includes means as now to be described.

Figures 5, 6, 7, 8, 9, 10, 11:
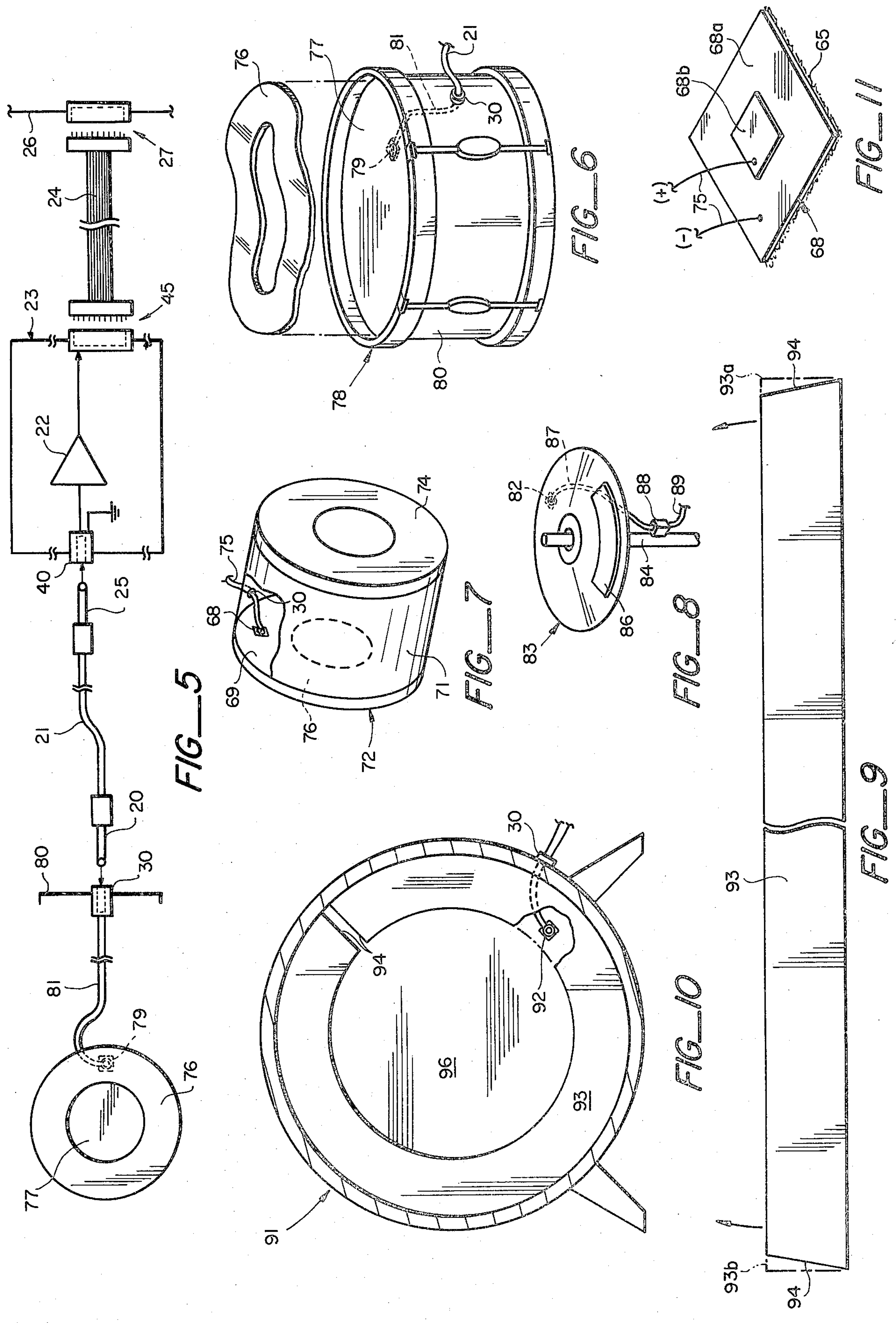
FIG. 5 shows a diagrammatic view of interconnections being made between a drumhead and a control console including a line driver unit contained in a junction box therebetween.
FIG. 6 shows a diagrammatic perspective view of a drum being provided with means for inhibiting prolonged vibration of the drumhead.
FIG. 7 shows a diagrammatic bottom perspective view of a drum with a portion broken away disclosing the location of a transducer fixed to a drumhead and carrying means for inhibiting prolonged vibration of the drumhead.
FIG. 8 shows a diagrammatic perspective view of a cymbal having means for transducing signals directly therefrom and inhibiting prolonged vibrations thereof.
FIG. 9 shows an elongate piece of foam adapted to be formed in a circular configuration and inserted into a bass drum as shown in FIG. 10.
FIG. 10 shows a diagrammatic elevation section view of a bass drum including an elongate body of foam material inserted therein for inhibiting prolonged vibrations of the drumhead.
FIG. 11 shows a diagrammatic perspective view of a transducer of a type to be secured to the impact portions of the drum set.

For example, as pertains to the tom-tom 72 shown in FIG. 7, an impact responsive transducer 68, such as a piezo electric element, is mounted directly onto the back surface of the drumhead 69 by a suitable silicone-RTV glue characterized by a pliant property after "hardening" or setting up.

As shown in FIG. 11 transducer 68 comprises a thin, flexible cathode plate 68*a* of brass (or other conductive, flexible material) and a smaller plate 68*b* of suitable piezo-electric material forming an anode secured to plate 68*a*. The glue 65 permits transducer 68 to flex with movement of the drumhead vibrations.

Thus, the vibration output of drumhead 69 will be transmitted via transducer 68 and leads 75 extending through a simple phone jack 30 carried in the sidewall 71 of drum 72.

The drum as shown includes a bottom head 74 formed in an annular configuration in which the central portion may be open.

It has been observed that the prolonged vibrations of a drumhead or cymbal or other impact portion of an audio signal source can create an objectionable feedback through the same impact portion to the transducer associated with the impact portion. Accordingly, means for damping the vibrations of the impact portions of the signal sources has been provided for inhibiting objectionable mechanical feedback of the kind described.

Thus, as shown in FIG. 6 an annular resilient pad 76 preferrably of neoprene material, is secured with silicone-RTV glue upon drumhead 77 of drum 78 and on drumhead 69 of drum 72 (FIG. 7). A transducer assembly 79, of the type described above with respect to transducer assembly 68, carried by the back surface of the drumhead 77 feeds signals via leads 81 through the sidewall of drum 78.

As shown in FIG. 5 the opposite ends of lines 21 carry plugs 20, 25 for engaging jacks 30, 40, respectively carried by the shell 80 of a drum 78 and junction box 23. Jacks 40 lead to associated line drivers 22 whose output is coupled to cable 24 by a given connection in cable connector assembly 45.

As shown in FIG. 8, cymbal 83 mounted upon a mounting standard 84 carries a transducer assembly 82 similar to transducer assembly 68. Assembly 82 lies in a protected position beneath the cymbal while a resilient pad 86 carried on the top side of the cymbal serves to damp prolonged vibration of the cymbal to inhibit audio feedback from entering the system.

Accordingly, as shown in FIG. 8, a lead 87 connects transducer 82 to a simple in-line phone jack type coupling 88 secured to mounting standard 84 whereby leads 89 carry the signals from cymbal 83.

Means for damping out prolonged vibrations of the head of a bass drum 91 serve to inhibit objectionable mechanical feedback to a transducer 92 and comprises an annular body 93 of resilient material, such as foam rubber, disposed within drum 91. The back side of the striking surface 96 of drum 91 is disposed to engage body 93 to inhibit prolonged vibration of the drumhead for the purposes noted above.

Annular body 93 can be readily formed from a slab of foam rubber or other resilient material having a length generally corresponding to the inner diameter of the drum. By removing triangular end edge portions 93*a* and 93*b* the end faces 94 will be disposed in confronting relation when slab 93 is rolled into an annulus within the drum and between the drumheads.

When the back head of the drum is applied it is preferred to introduce a slight compression to body 93 so as to hold it firmly against the back side of drumhead 96.

From the foregoing it will be readily evident that the impact portion of the cymbals and drums which serve to originate an audio sound to be modified are individually isolated from one another by connecting the transducers directly to impact portions of the sound originating devices.

In a system of the kind described the sounds being generated by the cymbals and drums will have slightly varied characteristics and will play at a reduced loudness in view of the use of the pads 76, 86 and body 93. Accordingly, for the performer to "hear" the music that he is playing, headphones 97 can readily be coupled to outlet 109 for receiving the composite sound from all channels by the paths described above.

The foregoing system can readily be added to existing drum sets with no significant permanent alteration of the drum set itself. Accordingly, the system can be usefully employed as an "add-on" system for equipment already in existance.

Further, other musical instruments having a vibrating sound generating surface such as the back side of a guitar, the sounding board of pianos, etc. can operate with the above described system.

I claim:

1. In a sound system for use with portions of a drummer's set-up of cymbals and drums for transducing audio signals from a plurality of discrete sources originating said signals, means for isolating the signals from said sources with respect to each other, transmission channels respectively associated with each of said sources for carrying said signals, respectively settable tone control means for each said channel for modifying the signals thereof, means for providing a plurality of special effects to be applied to the signals from said sources, control means for each said channel for selecting a special effect to be applied to the signals of said channel, and means for directing the signals of the respective channels in common to each of their respective selected special effects, the first named said means comprising transducers carried by impact portions of each of said sources originating said audio signals, and means for damping the vibrations of said impact portions to inhibit objectional mechanical feedback through said impact portions to said transducers.

2. In a sound system for transducing audio signals from a plurality of discrete sources originating said signals, means for isolating the signals from said sources with respect to each other, transmission channels respectively associated with each of said sources for carrying said signals to be reproduced, the first named said means including transducers carried by impact portions of each of said sources originating said audio signals, and means for damping the vibrations of said impact portions to inhibit prolonged vibration thereof.

3. In a sound system for isolating the individual sounds of the components of a drummer's set-up having cymbals and drums, transducers carried by dynamic impact portions of said components, transmission channels respectively associated with said transducers for carrying transduced signals for reproduction, and means carried by said portions for damping prolonged vibration thereof to inhibit objectionable mechanical feedback through said impact portion to an associated transducer.

4. In a sound system according to claim 3 in which the last named means comprises an annular resilient pad laid upon the striking surface of a drum.

5. In a sound system according to claim 3 in which the last named means comprises an annular body of resilient material disposed within a drum, the back side of the striking surface of the drum engaging said body for damping prolonged vibration thereof to inhibit objectionable mechanical feedback through said impact portion to an associated transducer.

6. In a sound system according to claim 3 in which the transducer associated therewith is carried on one side of a cymbal, and the last named means includes a resilient pad carried on the other side of the cymbal for damping prolonged vibrations of said cymbal to inhibit audio feedback entering the system.

7. In a sound system for isolating the individual sounds of the components of a drummer's set-up having cymbals and drums, transducers carried by dynamic impact portions of said components, transmission channels respectively associated with said transducers for carrying transduced signals for reproduction, and means carried by said portions for damping the sound from same.

* * * * *